(12) United States Patent
Haberkorn

(10) Patent No.: US 6,478,061 B2
(45) Date of Patent: *Nov. 12, 2002

(54) COURIER EXPRESSABLE CARGO QUILT AND METHOD THEREFOR

(76) Inventor: Robert W. Haberkorn, 8809 Prestwick La., Orland Park, IL (US) 60462

( * ) Notice: Subject to any disclaimer, the term of this patent is extended or adjusted under 35 U.S.C. 154(b) by 0 days.

This patent is subject to a terminal disclaimer.

(21) Appl. No.: 09/733,785

(22) Filed: Dec. 11, 2000

(65) Prior Publication Data

US 2001/0006083 A1 Jul. 5, 2001

Related U.S. Application Data

(63) Continuation of application No. 08/689,435, filed on Aug. 12, 1996, now Pat. No. 6,196,287.

(51) Int. Cl.$^7$ .................................................. B23B 3/06
(52) U.S. Cl. ........................ 150/154; 150/901; 206/547; 206/494; 410/121; 428/102
(58) Field of Search ................................. 150/154, 901; 206/545, 494; 410/121; 428/102

(56) References Cited

U.S. PATENT DOCUMENTS

| 924,275 A | * | 6/1909 | Richardson | 206/585 |
|---|---|---|---|---|
| 1,860,812 A | * | 5/1932 | Marshall | 206/494 |
| 2,068,167 A | * | 1/1937 | Dwight | 206/494 |
| 3,343,534 A | * | 9/1967 | Keoughan, Jr. et al. | 206/494 |
| 4,201,029 A | * | 5/1980 | Lerner et al. | 206/494 |
| 4,564,108 A | * | 1/1986 | Widlund et al. | 200/494 |
| 4,801,005 A | * | 1/1989 | Haitn et al. | 206/494 |
| 5,506,020 A | * | 4/1996 | Haberkorn | 150/901 |

FOREIGN PATENT DOCUMENTS

BE 542694 * 11/1955 ................. 206/494

* cited by examiner

*Primary Examiner*—J. Moy

(57) ABSTRACT

A courier expressable cargo quilt having an elongated, substantially rectangular body comprising an insulative material including a plurality of panels substantially foldably connected, defining an accordian-like structure, the accordian-like structure having an unfolded position adapted to facilitate placement of the body substantially over a tmperature sensative load by unfolding the accordian-like structure and a folded position adapted to provide a courier-expressable cargo quilt; and an exterior cover structure adapted to at least partially enclose the accordian-like structure.

10 Claims, 9 Drawing Sheets

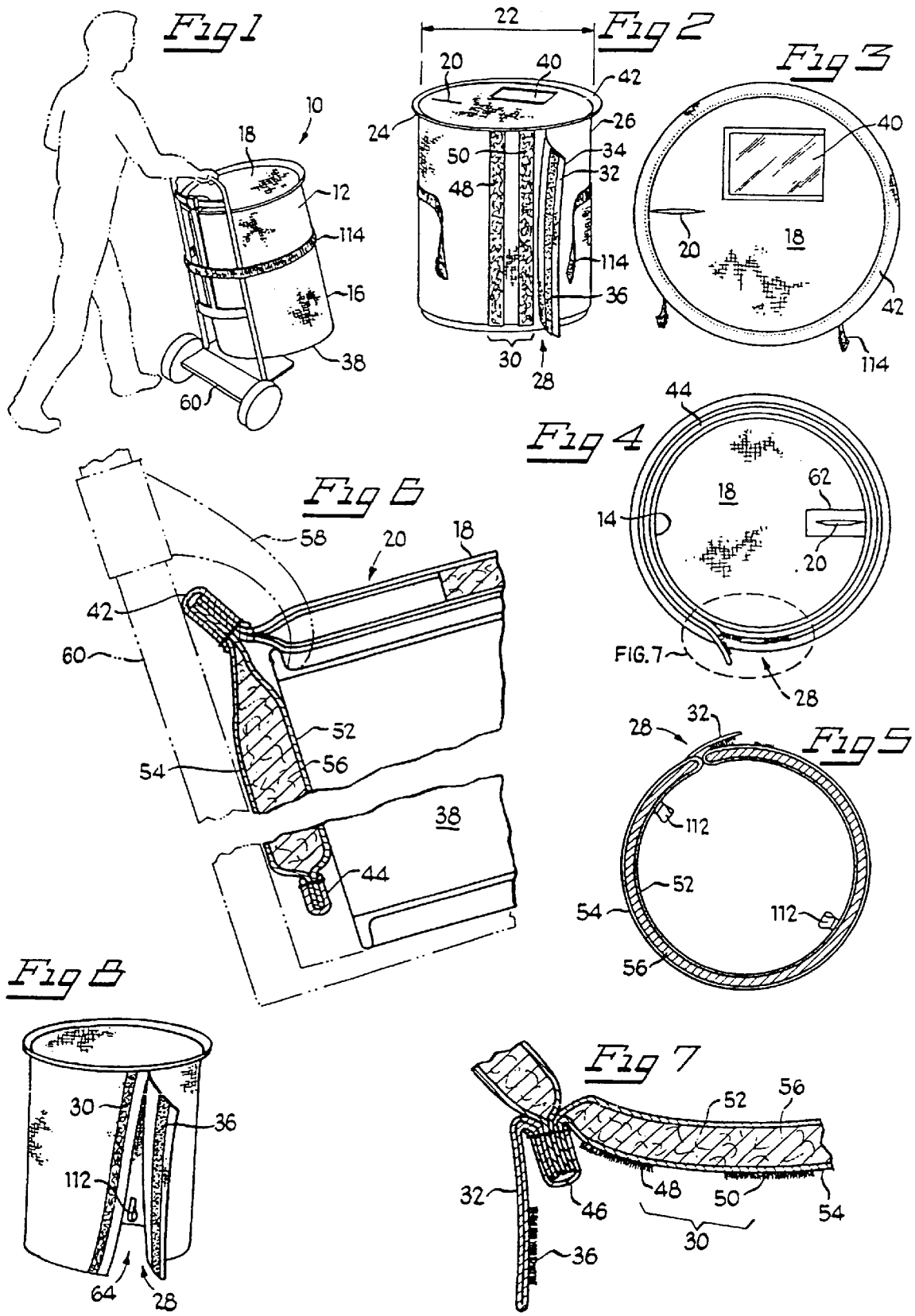

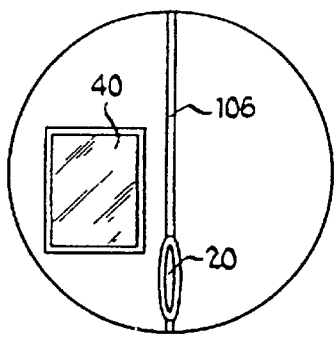
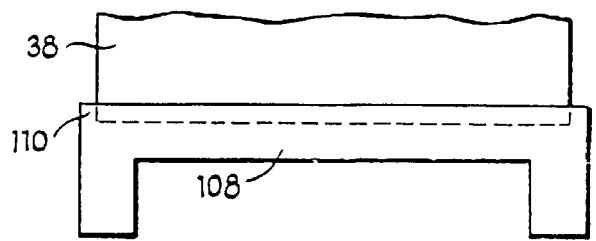
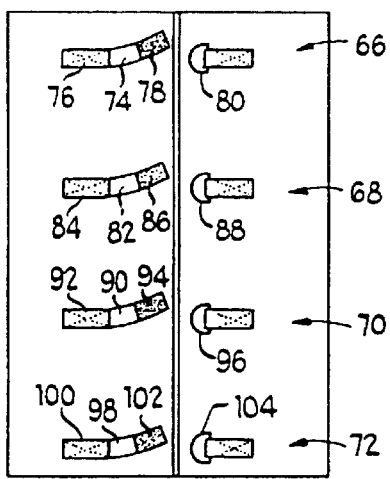
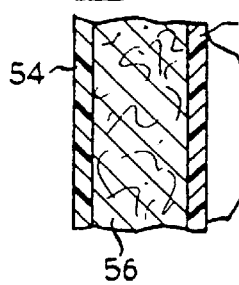
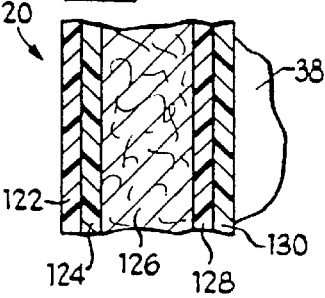
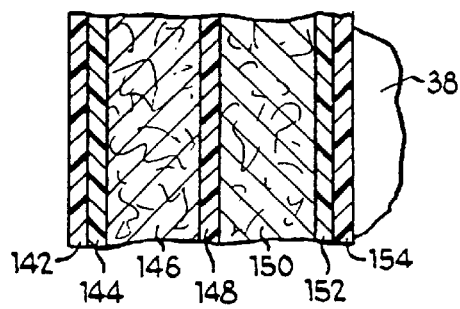
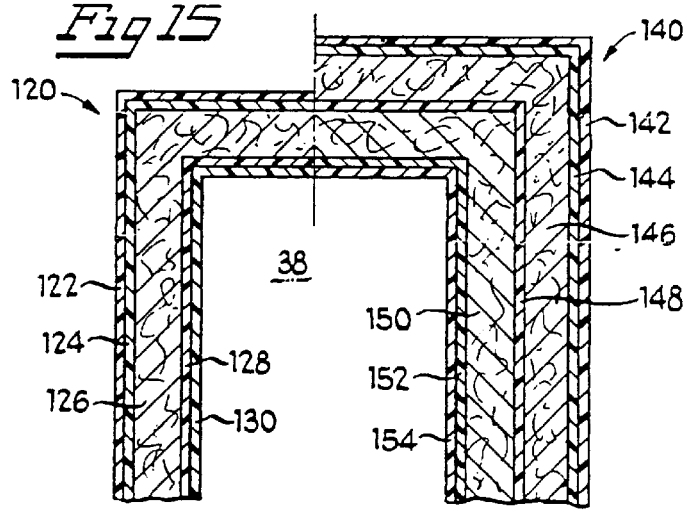

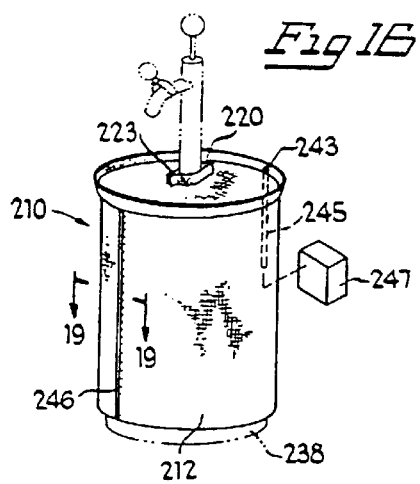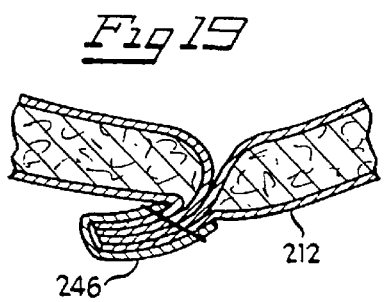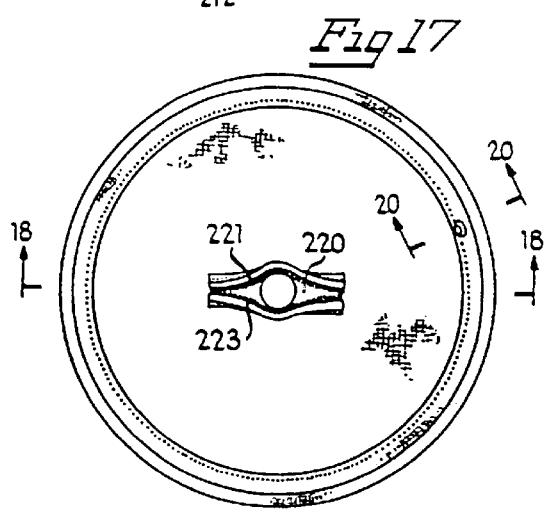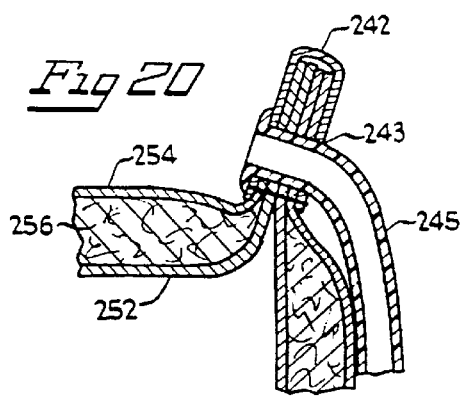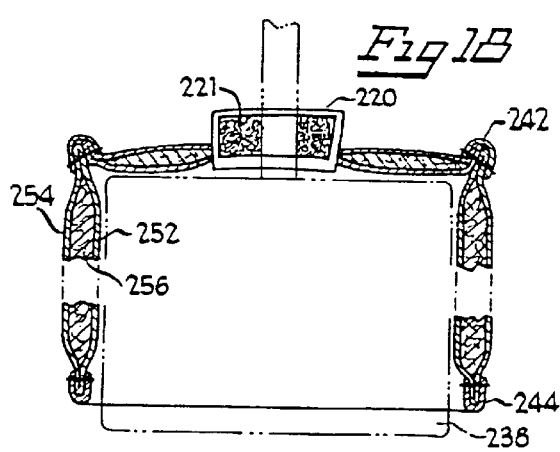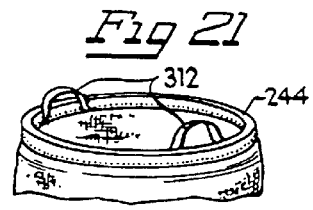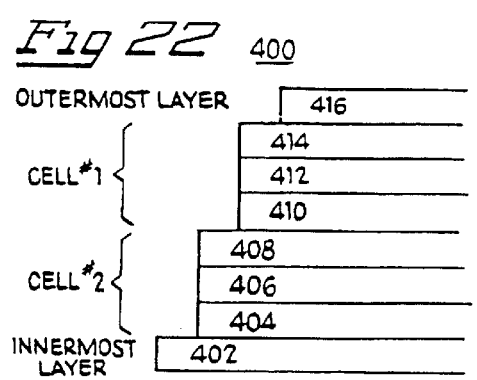

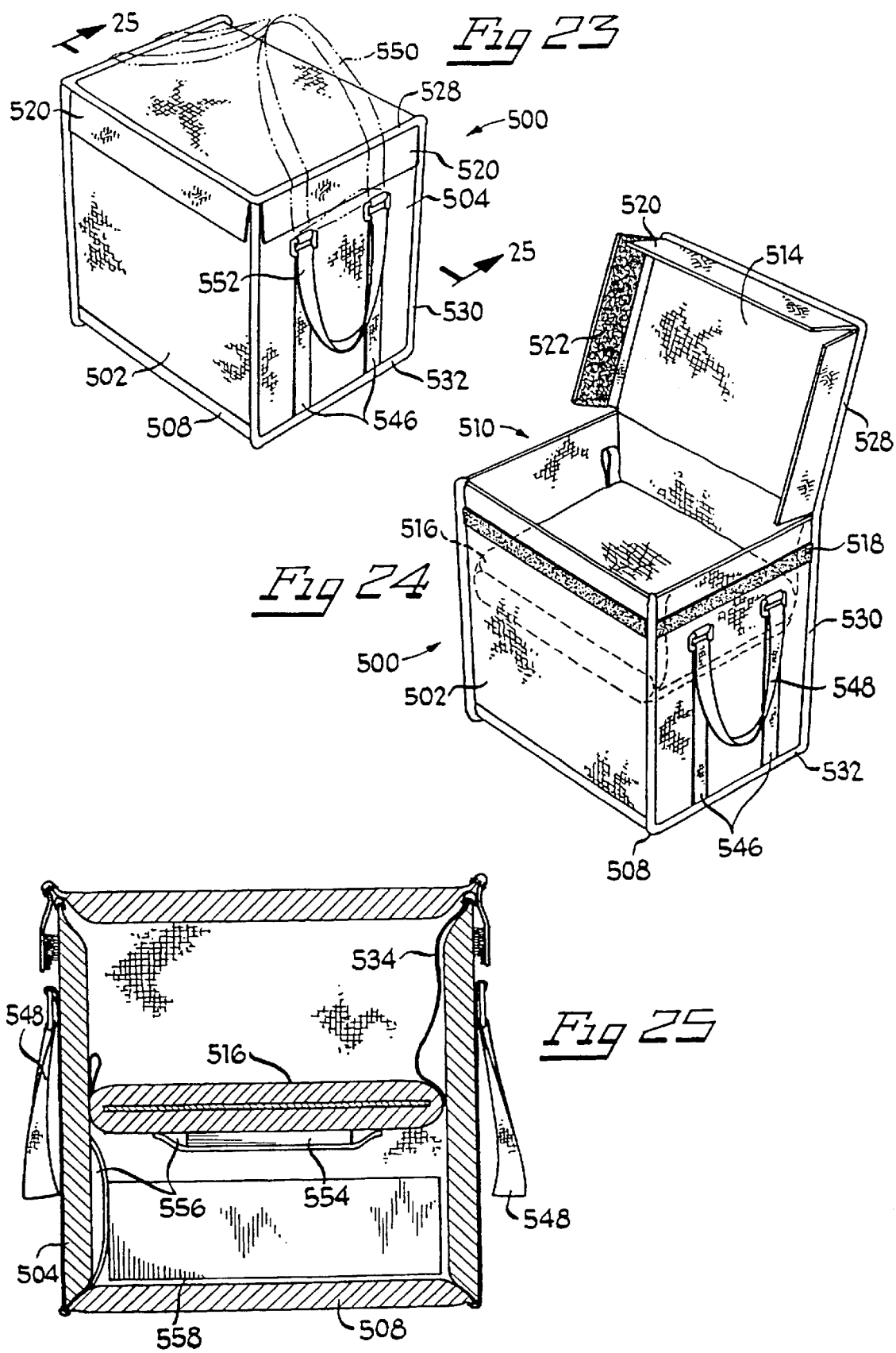

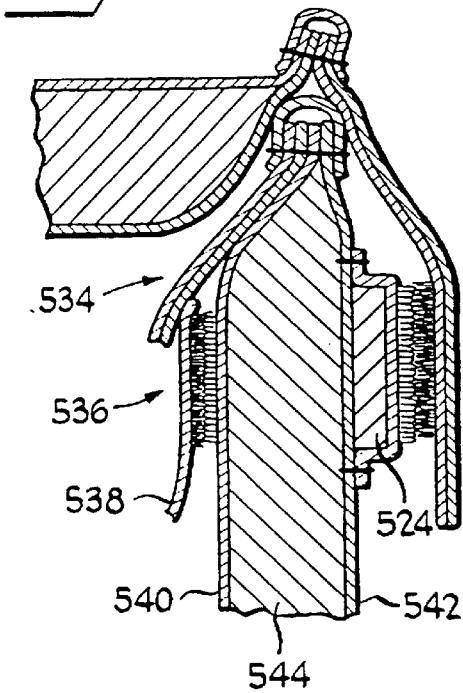
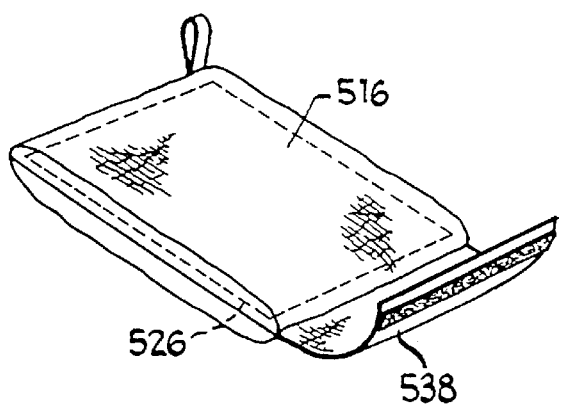
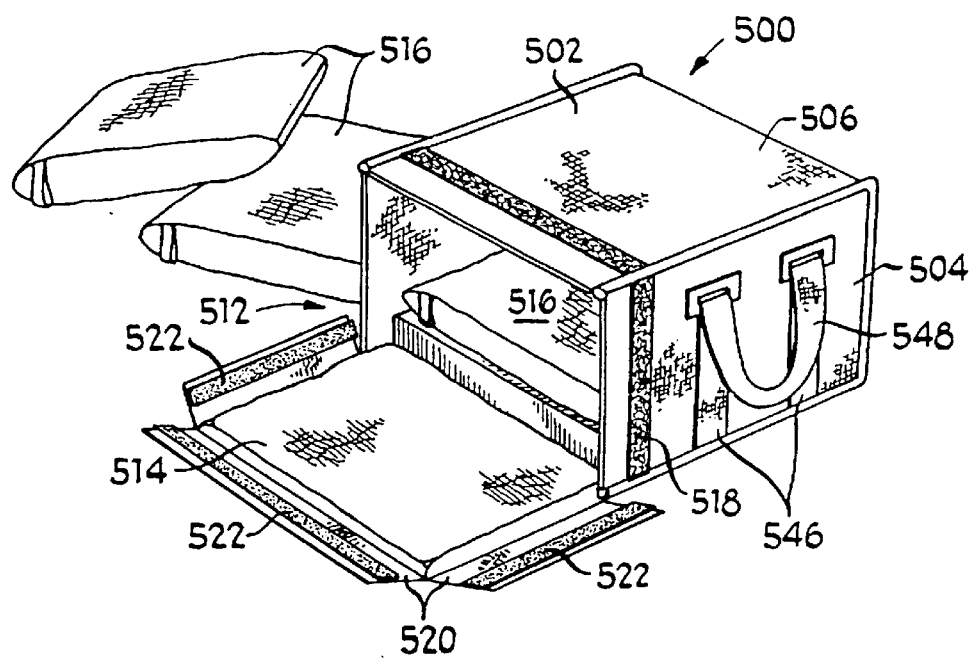

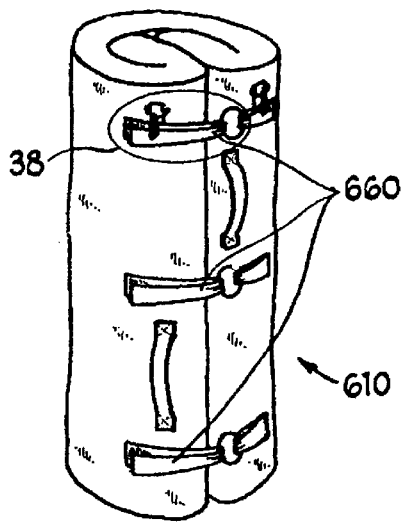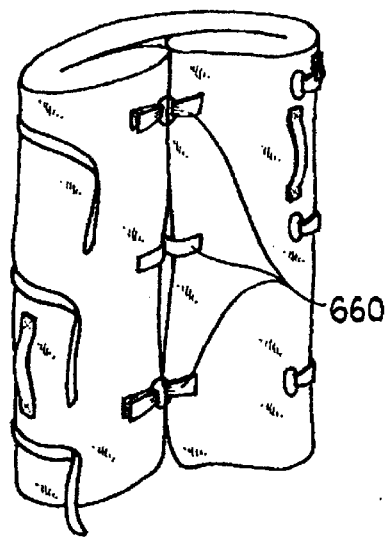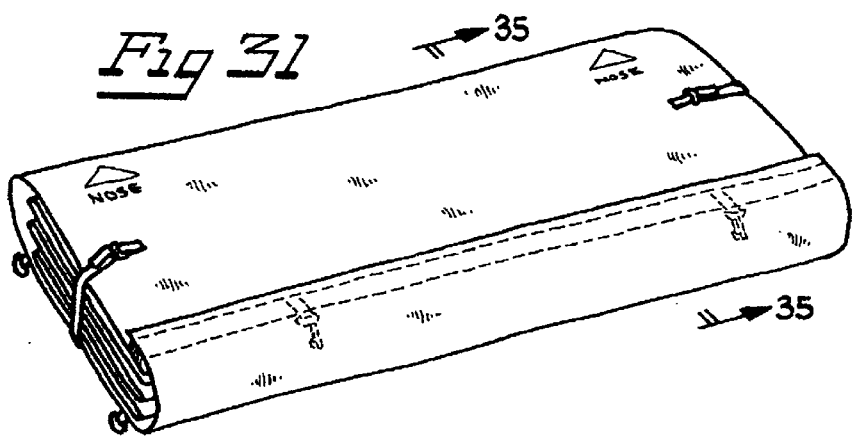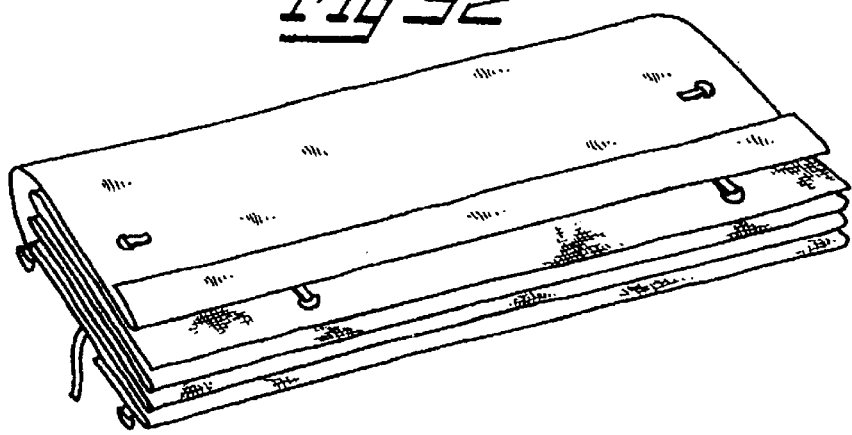

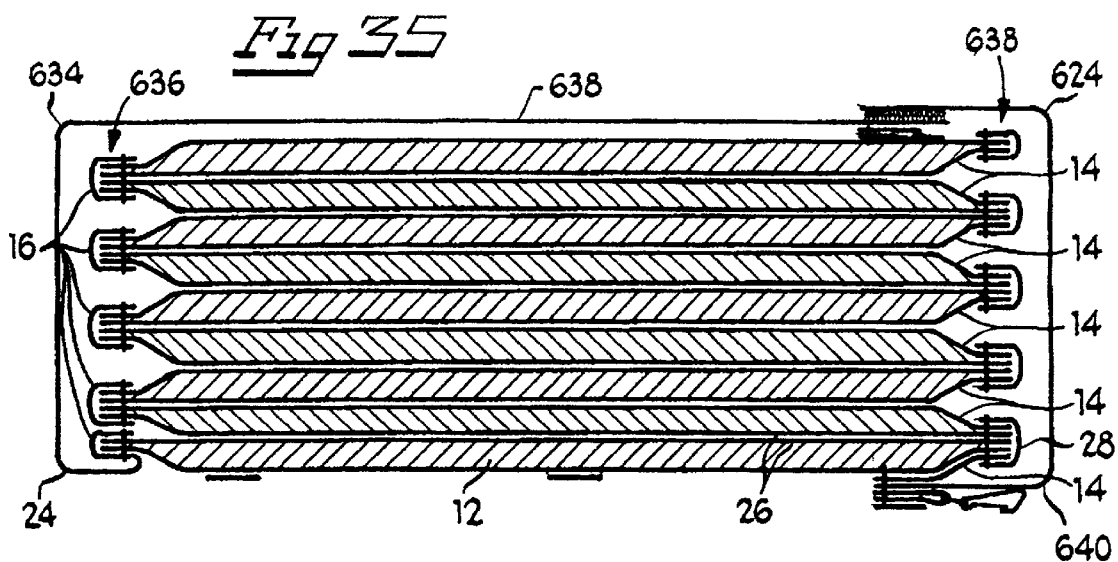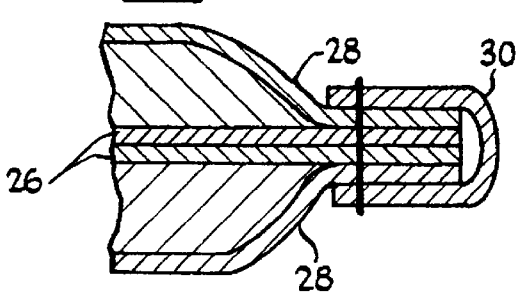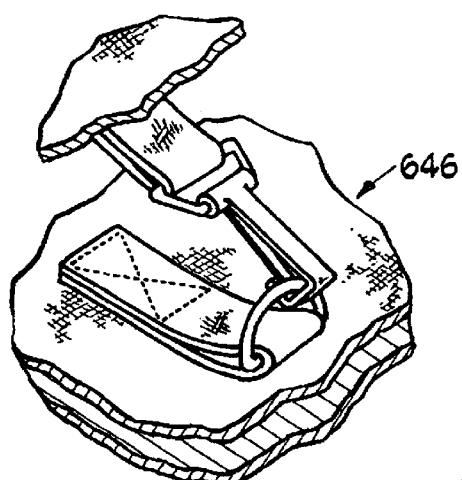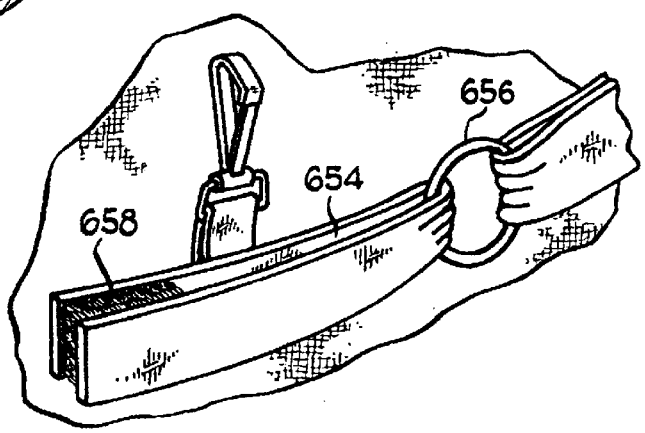

COURIER EXPRESSABLE CARGO QUILT AND METHOD THEREFOR

The present application is a continuation of prior U.S. application Ser. No. 08/689,435, filed on Aug. 12, 1996 now U.S. Pat. No. 6,196,287, which is hereby incorporated by reference, and priority thereto for common subject matter is hereby claimed.

FIELD OF THE INVENTION

This invention relates to cargo quilts, and particularly to courier-expressable cargo quilts and a method therefor.

BACKGROUND OF THE INVENTION

There is a need to insulate and provide minimal temperature variations to temperature sensitive materials. A drum, keg or insulative quilt that could provide a secure and tight fit around a drum of temperature sensitive material would be considered an improvement. An insulative quilt, and light weight and portable container that would provide an insulation air pocket and barrier for minimal temperature loss for the temperature sensitive material or exposure to the outside environment, and further would be self inflatable, would be considered an improvement in the art.

BRIEF DESCRIPTION OF THE DRAWINGS

FIG. 1 is a perspective view of a drum quilt in use, substantially insulating temperature sensitive goods in a drum, shown being transported on a drum hand truck, in accordance with the present invention;

FIG. 2 is a front elevational view of the drum quilt shown in FIG. 1, with an interconnectable structure, in accordance with the present invention;

FIG. 3 is a top plan view of the drum quilt shown in FIG. 1, with a drum strap and window, in accordance with the present invention;

FIG. 4 is a top plan view of an embodiment of the drum quilt shown in FIG. 1, with an interconnectable structure (not shown interconnected) and with a reinforced area surrounding a slit adapted to receive a hook section of a drum hand truck, in accordance with the present invention;

FIG. 5 is a bottom plan view of the drum quilt shown in FIG. 1, with pull down straps adapted to facilitate placement over a drum, in accordance with the present invention;

FIG. 6 is a partial side sectional view of the drum quilt shown in FIG. 1, with a slit with a drum hook inserted therein and therethrough, in accordance with the present invention;

FIG. 7 is a partial enlarged plan cross section of the drum quilt taken from FIG. 4, with a vertical binding and interconnectable structure shown in a disconnected position, in accordance with the present invention;

FIG. 8 is a perspective view of an alternate embodiment of a drum quilt with a side opening and interconnectable structure, shown in an open position, in accordance with the present invention;

FIG. 9 is a front side view of a preferred embodiment of a drum quilt with an interconnectable structure including adjustable securement straps and rings, in accordance with the present invention;

FIG. 10 is a top plan view of the drum quilt shown in FIG. 9, with a top slit, central seam and window, in accordance with the present invention;

FIG. 11 is a sectional view of a bottom portion for use in connection with the drum quilt, in accordance with the present invention;

FIG. 12 is a partial side sectional view of an embodiment of the drum quilt shown in FIG. 1 and an insulative quilt, with a three layer body, in accordance with the present invention;

FIG. 13 is a partial side sectional view of an embodiment of the drum quilt shown in FIG. 1 and an insulative quilt, with a five layer body, in accordance with the present invention;

FIG. 14 is a partial side sectional view of an embodiment of the drum quilt shown in FIG. 1 and an insulative quilt, with a seven layer body, in accordance with the present invention;

FIG. 15 is a partial side sectional view of an embodiment of the drum quilt shown in FIGS. 1, 9, 13 and 14 and an insulative quilt, with preferred five (on the left) and seven layer bodys (on the right), in accordance with the present invention;

FIG. 16 is a perspective view of a keg quilt in use, insulating goods in a keg, in accordance with the present invention;

FIG. 17 is a top plan view of the keg quilt shown in FIG. 16, in accordance with the present invention;

FIG. 18 is a partial side sectional view of the keg quilt shown in FIG. 17, along the lines 18—18, showing a center slit and top and bottom bindings, in accordance with the present invention;

FIG. 19 is a partial sectional view of the keg quilt shown in FIG. 16, along the lines 19—19, with a vertical binding, in accordance with the present invention;

FIG. 20 is a partial sectional view of the keg quilt shown in FIG. 17, along the lines 20—20, with an opening through the binding and tube operably connected to a reservoir, in accordance with the present invention;

FIG. 21 is a partial perspective view of a bottom portion of the keg quilt in FIG. 16, with pull down straps and a lower binding, in accordance with the present invention;

FIG. 22 is a partial side sectional view of an embodiment of an insulative quilt, in accordance with the present invention;

FIG. 23 is a perspective view of an insulated container in a closed position, in accordance with the present invention;

FIG. 24 is a perspective view of the insulated container in an open position showing an adjustable floater structure therein, in accordance with the present invention;

FIG. 25 is a cross sectional view of the insulated container along lines 25—25 in FIG. 23, in accordance with the present invention;

FIG. 26 is a partial cross sectional view of the insulated container in FIG. 25 in the area indicated as item 25, in accordance with the present invention;

FIG. 27 is a perspective view of a removable and detachable floater in FIG. 24, in accordance with the present invention; and FIG. 28 is a perspective view of an alternate embodiment of an insulated container in an open position showing a plurality of floaters for seperating, heating or cooling contents in the insulated container, in accordance with the present invention.

FIG. 29 is a perspective view of a courier expressable cargo quilt in a portable and closed condition, in accordance with the present invention;

FIG. 30 is a perspective view of the courier expressable cargo quilt in FIG. 29, in a partially open condition, in accordance with the present invention;

FIG. 31 is a perspective view of the courier expressible cargo quilt in FIG. 29, in a partially open condition and laid flat, in accordance with the present invention;

FIG. 32 is a perspective view of the courier expressable cargo quilt in FIG. 29, in a partially open condition and laid flat, and the front flap is shown pulled apart (shown Velcro held) and tucked under panels exposing hook rings on top of a first panel, in accordance with the present invention;

FIG. 35 is a schematic, side cross section through line 31—31 of FIG. 31, in accordance with the present invention;

FIG. 36 is an enlarged, partial cross section from FIG. 34, in accordance with the present invention;

FIG. 37 is an enlarged, perspective elevation from FIG. 33, in accordance with the present invention;

FIG. 38 is an enlarged, perspective elevation from FIG. 29, in accordance with the present invention;

DETAILED DESCRIPTION OF THE PREFERRED EMBODIMENT

Figure 33:
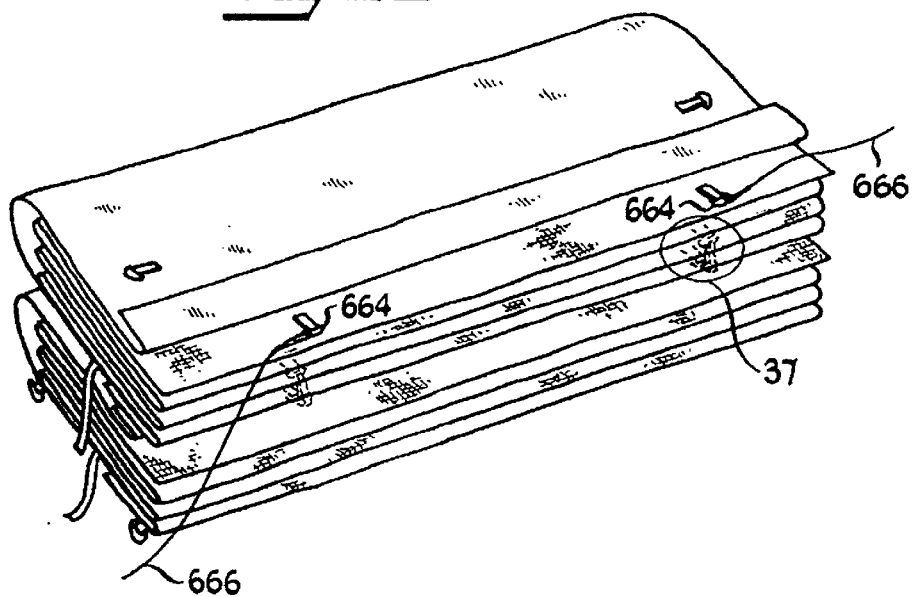
FIG. 33 is a perspective view of the courier expressable cargo quilt in FIG. 29, comprising two interconnected cargo quilts, in a partially open and laid flat condition, the second cargo quilt is opened and laid on top of the first cargo quilt unit, the first and second cargo quilts are inter-connected, and pull rings are shown clipped to hook rings, in accordance with the present invention.
Figure 34:
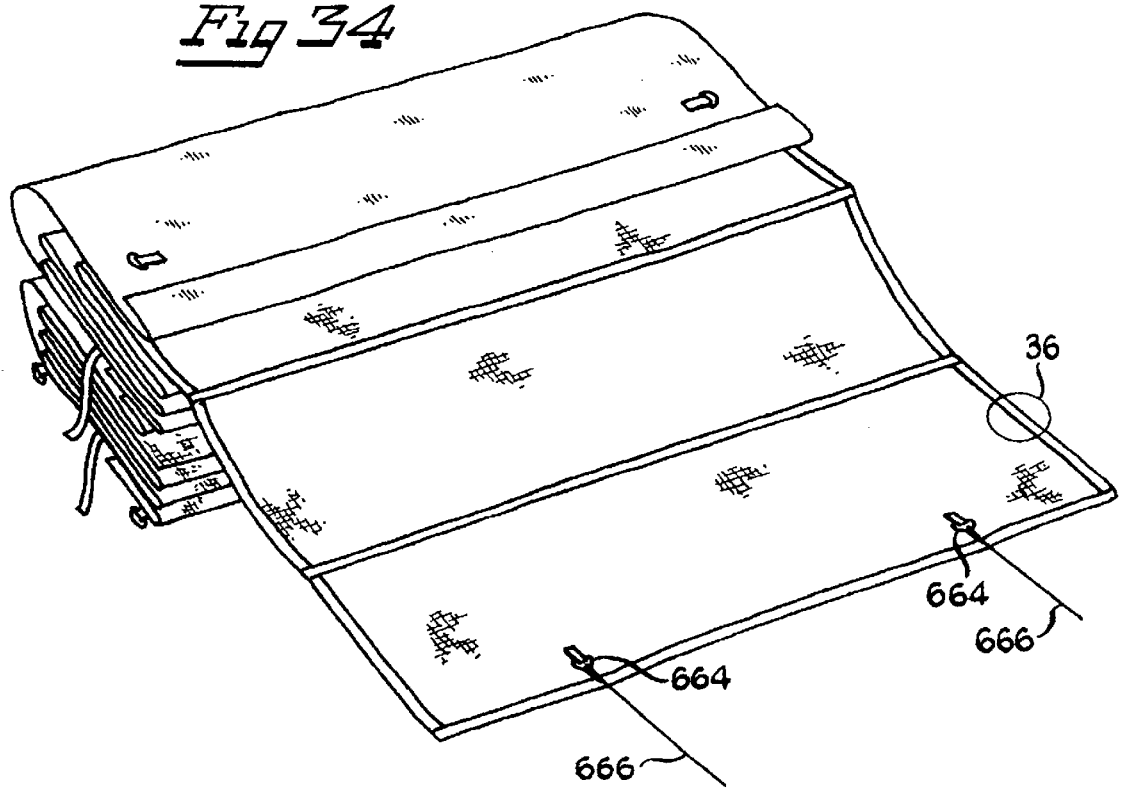
FIG. 34 is a perspective view of the courier expressable cargo quilt in FIG. 33, the first cargo quilt is shown partially pulled over a cargo (not shown) by chords, in accordance with the present invention.

Referring to the figures, a drum and insulative quilt adapted for insulating a container with temperature sensitive contents from the surrounding environment is shown.

The drum quilt 10 can include: a substantially tubular open-bottom body 12 having an open-bottom 14 including a sidewall section 16 and a top section 18 having a slit portion 20; the sidewall 16 includes a predetermined diameter 22 defined as a distance from one side 24 of the sidewall to an opposite, other side 26; and a diameter adjusting device 28, whereby the sidewall diameter 22 is adjustable from a wide diameter position to a narrow diameter position.

Some of the major advantages of the drum quilt 10, can include the following. It substantially improves the maintainance of a consistant temperature inside the drum quilt, and is less subject to wide temperature variations, as compared to an uninsulated drum. This structure provides a secure and tight fit to a drum 38, for improved insulation. A tight fitting quilt 10, can provide an insulation air pocket and barrier for minimal temperature loss or exposure to the outside environment. More particularly, the quilt 10 provides an inflatable, air barrier insulation provided by the body 12, substantially enveloping the drum 38 and contents from the outside environment. The drum quilt 10 is adjustable to fit conventional or unconventional (irregular) drum or keg sizes. The open-bottom 14 provides for simplified installation and removal.

Additionally, the drum quilt 10 is adaptable to being folded, placed in a package, and can then be express courriered back to a desired location, after use, such as by UPS. And, the drum quilt can be made of a durable material which is adapted to providing some cushioning around the drum during transportation, as well as insulation of the drum contents (temperature sensative) from the elements on a loading dock, or on or in a truck, for example.

In FIG. 1, a fastening belt is shown for attachment to a drum truck 60, for improved transportation and maneuvering of drums.

In one embodiment as shown in FIG. 2, the diameter adjusting device 28 includes at least one outwardly facing interconnectable structure 30 positioned substantially vertically and extending substantially from the top 18 to the bottom 14 on the sidewall 16. A flap section 32 attached to the sidewall 16 can have an inner portion 34 having an inwardly facing interconnectable structure 36, adjustably, interconnectable with the outwardly facing interconnectable structure 30. This structure provides a secure and tight fit to a drum 38, for improved insulation. A tight fitting quilt 10, can provide an insulation air pocket and barrier for minimal temperature loss or exposure to the outside environment. More particularly, the quilt 10 provides an inflatable, air barrier insulation substantially enveloping the drum 38 and contents from the outside environment.

As best shown in FIGS. 2 and 3, the drum quilt 10 can include at least one of the top 18 and the sidewall sections 16 having a substantially clear window 40, adapted to receive a document viewable through the window 40. This structure advantageously provides a clear plastic window, to view a bill of lading on top 18 and when on the sidewall 16, for presenting a Department of Safety placard, a MSDS sheet or the like.

Referring to FIG. 6, the top section 18 and sidewall section 16 can be bound by an upper binding 42, and the open-bottom 14 and sidewall section 16 can be bound by a lower binding 44. This structure provides an outwardly extending resilliant (springy), open-bottom structure for easy placement over and removal from a drum 38. Additionally, this structure provides improved conformance to the drum 38, because the bindings 42 and 44 tend to extend outwardly, and the adjustment structure 28 improves a tight envelop and insulation barrier around the drum 38.

As best shown in FIG. 7, a substantially vertical sidewall binding 46 can connect the flap 32 with the sidewall section 16, which is adapted to provide a durable structure, to securely fit around a wide diameter or narrower diameter drum structure. By connecting the structure 36 to one of the outwardly facing structures 48 and 50, for example, a tight fit is obtainable. In a preferred embodiment, the structures 30, 36, 48 and 50 include strips of interconnectable structures, such as Velcro and the like, for easy adjustment.

As illustrated in FIGS. 6 and 12–15, the body 12 includes an interior portion or layer 52, an exterior portion or layer 54 and an insulative portion or layer 56. Advantageously, each contributes to the body's durability and resistance to abrasion. A tight fitting quilt 10 with the desired body 12 construction, can provide an insulation air pocket and barrier for minimal temperature loss or exposure to the outside environment. More particularly, a suitable body 12 construction provides a self-inflatable, air barrier insulation substantially enveloping the drum 38 and contents from the outside environment.

In FIG. 6, the drum quilt 10 has a slit portion 20 preferably positioned on the top 18 adjacent to a portion of the sidewall 16, adapted to receive a hook portion 58 of a drum truck 60, for facilitating transportation of a drum with temperature sensative contents. The placement near the sidewall 16, helps to facilitate connection and removal of the hook 58, from the slit 20 and drum 38. Another feature of the drum quilt 10, is that the slit 20 has an automatic closing at rest feature, or self closing feature (when not in use), to substantially maintain the desired insulation and temperature in the drum, as shown in FIG. 4.

The slit 20 can include a reinforcement layer or area 60, for improved integrity. More specifically, the slit portion 20 and reinforcement area 62, include a normally closed condition (action), to allow manipulation of the drum 38 in use during transportation, and will spring back closed after removal of the hook portion 58 of the drum truck 60.

In FIG. 8, the sidewall section 16 has an open-side portion 64, for simplified placement and removal in certain applications.

As shown in FIG. 9, the sidewall section 16 can include one or more interconnectable structures which are adjustably connected, for simplified diameter adjustment. This structure can accomadate one of many different diameters and configurations, ie. two or more different diameter drums or kegs, for example.

In a preferred embodiment, the sidewall section 16 includes at least one substantially adjustable securement device, substantially as shown in the figures. More particularly, the securement device can include a plurality of strap and ring securement devices, substantially as shown in FIG. 9.

In this embodiment, four equi-spaced securement devices, identified as items 66, 68, 70, and 72, are shown securely attached, such as sown directly to the sidewall section 16. This embodiment provides independant adjustment along various heights, for improved insulating and enveloping around the drum. Moreover, the strap and ring securement devices 66, 68, 70, and 72, provide for: (i) improved securement; (ii) ease of adjustment for a tighter and a firmer fit to a drum; and (iii) an improved system of insulating the temperature sensitive material in a keg, drum, container or the like. Additionally, the drum quilt 10 provides a self inflating air pocket and barrier, for further insulation between the temperature sensitive contents and the outside environment.

The diameter adjusting devices 66, 68, 70, and 72, include a number of vertically spaced belts and adjacent loops for individual adjustment of the diameter of the sidewall section, to accomodate standard or irregularly configured drums. More specifically, a first securement device 66 includes a first strap 74 with proximal and distal interconnectable structures 76 and 78, and adjacent anchor ring 80. The second securement device 68 includes a second strap 82 with proximal and distal interconnectable structures 84 and 86, and adjacent second anchor ring 88. The third securement device 70 includes a third strap 90 with proximal and distal interconnectable structures 92 and 94, and an adjacent third anchor ring 96. And finally, the fourth securement device 72 includes a fourth strap 98 with proximal and distal interconnectable structures 100 and 102, and adjacent fourth anchor ring 104. The securement devices are generally sewn or appropriately attached to the sidewall 16.

In a preferred embodiment, the securement devices 66, 68, 70 and 72, comprise Velcro, which is a commonly known interconnectable material. However, other structures can be used, such as but not limited to snapable belts, zippers, button and hole arrangements, and the like, as should be appreciated by those skilled in the art.

In FIG. 10, a top view of the drum quilt 10 in FIG. 9 is shown, with a window 40, center seam 106 and slit 20, for simplified replacement, in the event of damage to the top section 20. Another benefit to the drum quilt 10, is that it is substantially modular or made with replaceable components, for ease assembly and/or replacement and repair of component parts, if needed.

In FIG. 11, a cross-sectional view of a bottom portion 108. It can be made of an insulative material for improved insulation. Also, the bottom portion is adapted to minimize damage to the bottom of a drum when abruptly set down, for example. The bottom 108 is configured to receive a substantially conventionally shaped drum in an upperwardly facing receptacle section 110. In one embodiment, the bottom 108 comprises recycled tires or rubber.

Referring to FIGS. 12–15, various body 12 and insulative quilt constructions are shown. In FIG. 12, a single trip, substantially recyclable body construction is shown, as detailed previously, with interior layer 52, exterior layer 54 and insulative layer 56.

In a preferred embodiment, the body 10 includes: an interior layer 52 comprising a coated spun bonded polypropelene, preferably Typar model 3153 from Reemay; an exterior portion or layer 54 also comprising the same as above (a coated spun bonded polypropelene, preferably Typar model 3153 from Reemay); and an insulative portion 56 comprising a polypropelene, polyester, or the like, preferably a Dupont 808 material, also known as Hollofil. This is believed to be made of a polypropelene material. This construction provides for improved consistancy and self-inflatable body structure, after being crushed and folding during its life. The combination provides a self-forming and resilient, configuration and structure, which helps to keep the temperature sensitive material warm, hot or cold, as desired.

More specifically, the insulative portion 56 can comprise a plurality of individual layers of materials, for improved isolation of the temperature sensitive material from the environment.

In FIGS. 13 and 15, a multi-trip, (commonly referred to as therma-grade construction), multi-layer construction 120, body 12 is shown. This therma-grade construction 120 can vary widely. In a preferred embodiment, the individual layers include a first layer 122, preferably of a vinyl coated polyester or nylon, most preferably Imperial 600 from Nassimi Corp., in N.Y., N.Y.; second and fourth layers 122 and 128 of preferably a spun bonded material such as Typar; a third layer 126 of a holofil or spun bonded material, most preferably a Dacron Dupont 808 polyester material; and a fifth layer 130 comprising a coated polyester, such as a vynal coated nylon, such as Imperial 200 from Nassimi Corp. This construction provides a durable, self inflatable and resilient (springy) body 12, for improved placement and removal.

In FIGS. 14 and 15, a seven layer body construction 140, is shown with layers 142, 144, 146, 148, 150, 152, and 154, from the exterior to interior layers. In a preferred embodiment, the individual layers include a first layer (exterior) 142 and seventh interior layer 154, each comprising a vynal coated polyester, preferably Imperial 600 (denier) and vynal coated nylon material preferably Imperial 200, respectively; the second layer 144, fourth layer 148 and sixth layer 152 can comprise a spun-bonded or Typar material; and the third and fifth layers 146 and 150, can comprise a spun bonded material or holifil, preferably Dacron Dupont 808 polyester holifil, for providing a recycleable drum quilt, which can contribute to saving fuels and the like, by improved insulation.

The multi layer constructions provide improved insulation, and self inflating constructions which facilitate placement and removal, because of the resilient nature of the body 12, made with these constructions. A Nylon interior layer helps to facilitate placement on a drum, and a Vynal outer layer provides a durable exterior.

In one embodiment, pull down means, preferably in the form of opposite and interior pull-down straps 112 are utilized, as shown in FIGS. 5 and 8, for facilitating placement over a drum or keg, for example.

Thus, the drum quilt 10 is particularly adapted for insulating a container with temperature sensitive contents from the surrounding environment. In one application, it includes: a substantially tubular open-bottom body 12 having an open-bottom 14 including a sidewall section 16 and a top section 18 having a slit portion 20; the sidewall 16 includes a predetermined diameter defined as a distance from one side 24 of the sidewall to an opposite, other side 26; and a diameter adjusting device (securement device) as shown in the figures, whereby the sidewall diameter is adjustable from a wide diameter (at rest) position to a narrow (pulled taunt) position.

In FIGS. 16–21, a drum quilt in the form of a keg quilt 210, is shown. It is adapted for insulating a container/keg 238 with temperature sensitive contents, such as pop or beer from the surrounding environment. It can comprise: a substantially tubular open-bottom body 212 having an open-bottom 214 including a sidewall section 216 and a top section 218 having a slit portion 220; the sidewall 216 includes a predetermined diameter defined as a distance from one side 224 of the sidewall to an opposite, other side 226; and a substantially upwardly extending, upper binding 242 having a port 243 connectable to a resevoir 247 for receiving liquid.

In one embodiment, the open-bottom 214 and sidewall section 216 are bound by a lower binding 244. The keg quilt 210 contributes to minimizing waste by catching spilled liquid. The outer layer can include a substantially reflective layer to reflect the sunlight and the like, for improved insulation.

The difference between the drum quilt in FIG. 1 and the keg quilt 210, is the placement of the slit 220 in a substantially middle portion of the top section, and preferably includes first and second interconnectable sections 221 and 223 to adjustably close the slit 220, to maximize insulation. Most of the rest of the keg quilt 210 is substantially similar to the structure of the drum quilt 10, and thus the item numbers are similar but include two hundred, for simplicity (ie. drum quilt 10 and keg quilt 210, etc.)

In FIGS. 12–15 and 22, various embodiments of an insulative quilt body are shown.

The insulative quilt body in its simplest form, can comprise: interior and exterior layers having a coating of at least one of polypropylene and polyester; an insulative portion comprising a batt of staple fibers being sandwiched between inside sides of the interior and exterior layers; and a binding structure along perimeter edges of the interior and exterior layers securing the insulative portion therebetween. This construction is a cost effective improvement to insulate and minimize temperature fluctuations of temperature sensitive materials.

In one embodiment, the insulative portion or batt of staple fibers comprises a layer of at least one of spun bonded material and Hallofil placed between the interior and exterior layers to provide a predetermined thickness and density, to provide a desired insulation. Moreover, the batt of staple fibers herein provides a self-inflatable construction for improved insulation. It is believed that the insulative portion or batt of staple fibers includes a plurality of fibers each with hallow portions that trap air. Additionally, the batt also has air between each fiber. Thus, this construction provides at least two individual air pockets or insulation barriers made of air.

The exterior layer can include a substantially clear window adapted to receive a document viewable through the window. The window could include a shiping destination document, for example.

In a preferred embodiment, the interior and exterior layers comprise a coated, spun bonded material, the coating comprising at least one of polypropylene and polyester. The coating provides a substantially air-tight construction, for good self-inflating properties and improved insulation. In more detail, the interior and exterior layers comprise at least one layer of Mylar, Nylon and Vinyl, for a cost effective and suitable air-tight construction.

The body includes an interior portion, an exterior portion and an insulative portion, which comprise durable materials that can substantially withstand abrasion and severe environments. Various costructions are possible, depending on the application and requirements.

In one body construction, between the insulative portion and the interior and exterior layers are intermediate layers of a spun bonded material, defining a five or more layer construction, for improved durability and resiliance (or a springy construction).

In one example, the insulative portion comprises one or more layers of a spun bonded material and one or more layers of a polyester Hallofil or generic Hallofil material, depending on the desired density and insulation properties. The term Hallofil is a term of art and has its ordinary meaning. In a preferred embodiment, the Hallofil is Dacron Hallofil polyester 808/908 from DuPont. It should be understood that other Hallofils may be used depending on the requirements and specifications.

In a preferred embodiment, an insulative quilt body is constructed, to substantially enclose a body with a temperature sensitive material. The body can include: a first and a second cell each including: interior and exterior layers comprising spun bonded material each having a coating of at least one of polypropylene and polyester; an insulative portion comprising a batt of staple fibers of at least one of a spun bonded material and Hallofil material being sandwiched between the interior and exterior layers; and a binding structure comprising a seam along perimeter edges of the interior and exterior layers securing the insulative portion therebetween, defining a multi-layer insulative quilt body. Adventageously, this construction can provide two insulative and substantially springy, uniform, and resilient constructions. More specifically, each cell can define a self-inflatable and substantially springy insulation body.

In one embodiment, the batt of staple fibers includes a substantially intimate blend of fibers with a substantially consistant and uniform density. This contributes in providing a substantially springy, and more uniform construction. More particularly, each of the cells is substantially self-inflatable and provides at least some independant insulation.

More specifically, there are two preferred processes by which polyester high loft insulation can be stabilized. The first is spray bonding. A bonded batt is produced by polyester batting being sprayed with a resin (glue) and then dried typically in a three pass oven. On thicker battings, the spray may not fully penetrate into the middle of the batting, resulting in much of the resin laying on the exterior surfaces of the batting. This can create a stiffer, harder to mold batting. The middle fibers, can become unstabilized prematurely, which means they can loose their loft and some insulation properties prematurely.

The second process involves the use of intimate blend of fibers with different melting temperatures. For example, taking fibers that melt at low temperatures with regular fibers that do not melt at such low temperatures a more intimate batt can be produced. When this batting enters a one pass oven, the low melt fibers liquify, and flow over the other regular fibers, and when they leave the oven they cool down and solidify. This process provides a strong bonding between the two different fibers in the middle as well as the surfaces. The use of an intimate blend of fibers can provide a more resilient and better insulative material than the spray bonded process. In a preferred embodiment, the intimate blend of fibers include a high quality Dacron Hallofil polyester Hallofil 808/908,

TABLE 1

Title: UNICARGO MLI PILLOWS
Inf. Requested: THERMAL CONDUCTIVITY
Apparatus: HEAT FLOW METER
Test Method: ASTM-C-518

Results

| SAMPLE | THICKNESS (inches) | DENSITY (pcf) | THERMAL CONDUCTIVITY (BTU-in/hr-ft$^2$-° F.) 10° F. | R-VALUE |
|---|---|---|---|---|
| T0001 | 0.250 | 3.86 | 0.240* | 1.040 |
| T0002 | 1.150 | 1.37 | 0.268 | 4.284 |
| T0003 | 1.500 | 2.35 | 0.244 | 6.153 |
| T0004 | 1.500 | 1.34 | 0.267 | 5.620 |
| T0005 | 2.000 | 2.23 | 0.237 | 8.444 |
| T0006 | 2.000 | 1.25 | 0.264 | 7.589 |
| T0007 | 2.250 | 2.57 | 0.229 | 9.832 |
| T0008 | 1.500 | 3.53 | 0.247 | 6.066 |
| T0009 | 1.800 | 2.67 | 0.248 | 7.271 |
| T0010 | 0.850 | 3.98 | 0.227 | 3.740 |
| T0011 | 0.185 | 15.13 | 0.309* | 0.599 |

*COMMENTS: Except for samples T0001 and T0011, all the tests were run with a mean temperature of approximately 10° F. and a hot face temperature at or just above 32° F. Due to their relatively thin nature and the limitations of our machines, samples T0001 and T0011 were unable to hold the same ΔT as the others. Therefore the cold side was approximately 10 degrees (mean temp. 5 degrees) warmer an order to keep the hot face at 32° F.

TABLE 2

Title: UNICARGO MLI PILLOWS
Inf. Requested: THERMAL CONDUCTIVITY
Apparatus: HEAT FLOW METER
Test Method: ASTM-C-518‡

Results

| SAMPLE | THICKNESS (inches) | DENSITY (pcf) | THERMAL CONDUCTIVITY (BTU-in/hr-ft$^2$-° F.) 75° F. | R-VALUE |
|---|---|---|---|---|
| T0001 | 0.250 | 3.86 | 0.296 | 0.844 |
| T0002 | 1.150 | 1.37 | 0.332 | 3.468 |
| T0003 | 1.500 | 2.35 | 0.301 | 4.977 |
| T0004 | 1.500 | 1.34 | 0.328 | 4.573 |
| T0005 | 2.000 | 2.23 | 0.298 | 6.711 |
| T0006 | 2.000 | 1.25 | 0.337 | 5.936 |
| T0007 | 2.250 | 2.57 | 0.286 | 7.862 |
| T0008 | 1.500 | 3.53 | 0.299 | 5.018 |
| T0009 | 1.800 | 2.67 | 0.306 | 5.876 |
| T0010 | 0.850 | 3.98 | 0.272 | 3.125 |
| T0011 | 0.185 | 15.13 | 0.355 | 0.521 | which is made as detailed above, and it can be purchased from DuPont. It is particularly adapted for use in insulative quilts as detailed herein, which demand a high level of performance.

The interior and exterior layers comprise a coating of at least one layer of Mylar, Nylon, polyester, polypropylene and Vinyl, for providing a substantially air-tight construction, for improved insulation.

In one preferred embodiment, the first and second cells are substantially independant of each other and define at least a six layer construction which are simply two cells adhesively or suitably attached together. In another preferred embodiment, the first and second cells are substantially independant of each other and can define at least an eight layer construction. These constructions are particularly adventageous when used in connection with, but not limited to, drum quilts, pallet quilts, cargo quilts and the like.

Insulated Container

In its simplest form, an insulated delivery container 500 is shown in FIGS. 23–28, for insulating temperature sensitive contents from the surrounding environment. The container 500 can include: a body 502 including a sidewall section 504, a top section 506 and a bottom section 508 having at least one of an open-top 510 and open-sidewall 512; a door 514 pivotably connected to the body 502 for providing an open position for loading and unloading and a closed position for insulating contents therin, defining an enclosure; and a temperature control floater 516 for at least one of sealing temperatures in the enclosure and deviding the enclosure into at least two compartments, couplable to the body 502.

The container 500 provides the advantages of being portable, light weight and easy to carry and made of duarable, washable and long lasting materials, and is particularly adapted to transport all hot, chilled or cold or two of the three in the same container. As should be understood, two or more temperature control floaters (hereafter interchangably referred to as floater or temperature control floater or device) can be used. In this embodiment, three tempered items can be stored in the same container 500, with each enclosure in the container being defined by the dimensions of the container and each floater. For example, with two floaters three different tempered items ie. hot, chilled and cold, can be stored and transported, maintaining the desired temperatures for each tempered item for hours. The container 500 has many uses, and is particularly useful in the food, transportation and medical industries.

The body 502 in proximity to at least one of the open-top 510 (FIG. 24) and open-sidewall 512 (FIG. 28) includes an outwardly facing interconnectable structure 518 and the door 514 includes a flap section 520 attached to at least a portion of an outer periphery of the door 514 having an inner portion having an inwardly facing interconnectable structure 522, interconnectable with the outwardly facing interconnectable structure 518 of the body 502. This structure defines a closure system. In a preferred embodiment, upon completion of packing the container 500, the flaps 520 are suitably pulled down completely, to secure the structure 522 of the flaps 520 firmly against the corresponding outwardly facing interconnectable structure 518, both preferrably Velcro, for maintaining the desired temperature in the container 500 for a desired period of time.

In a preferred embodiment, the inwardly and outwardly facing interconnectable structures 522 and 518 comprise narrow strips of Velcro, for simplified opening and closing. Also, at least one of the inwardly and outwardly facing interconnectable structures 522 and 518 include rigidizers, as shown in FIG. 26, as item 524, to provide a substantailly flat surface for improved sealing.

As shown in FIG. 25, the floater is complementarily configured to be sucurely received in the container 500. In a preferred embodiment, the floater 516 includes an internal rigidizer 526, to provide a tight and secure fit within the container 500.

As shown in the FIG. 24, peripheral portions of the door, sidewall and bottom section are bound, as items 528, 530 and 532. These bindings contribute to providing the desired insulation and nearly air tight desired construction.

Referring to FIGS. 25 and 26, the floater 516 is shown pivotably coupled 534 to the body 502, for ease of adjustment, loading and unloading. In FIG. 26, the floater 516 is detachably coupled 536 at one end 538, to the body 502, for certain applications and ease of cleaning and adjustment. At the other end of the floater 516 a loop may be included, to facilitate handling and adjustment of the floater 516.

As shown in FIG. 25, the body 502 and door 514 include an interior portion 540, an exterior portion 542 and an insulative portion 544, for providing the desired insulation and asthetics.

The temperature control floater 516 contributes to minimizing loss of heat or cold depending on the application, and further helps to maintain a desired temperature for a longer period of time by seperating the tempered air space form a non-tempered air space. Thus, the smaller the tempered air space is (where the temperature sensitive materials are stored in the container 500), the longer the desired temperature will tend to remain. In addition, during loading and unloading of temperature sensitive materials in the container 500, the floater 516 provides a light weight insulation door that can be easily opened and closed, as desired, while maintaining and preserving the desired temperature in a tempered area (where the temperature sensitive materials are stored) in the container 500. Thus, the user does not have to open and close the open-top 510 or open-side 512 during loading, for example.

The containers shown in FIGS. 23 and 28, can be used to carry various materials, and are particularly adapted for use in connection with temperature sensitive materials, chemicals, and the food and medical industries, for example. The container 500 in FIG. 28, is adapted for use with flat materials, foods and the like, such as a lightweight pizza carrier.

In one embodiment, a light weight carrying tray, preferably a polymeric coated (ie. Michem coated) card board with a series of heat (or cool) exchange ports, is used for improved dense loading in the container.

In one embodiment, the floater 516 is a passive element defining an additional insulation layer, or an active element providing a heat, chill or cold source. As used herein, passive element means that the floater is free of a temperature source, and active element refers to a floater with a compartment, pocket or the like for helping to provide a desired temperature in proximity thereto. For example, the floater could include a pocket or enclosure for holding hot, cold or chill elements or sources, phase change materials, and the like. For example, when used in the food industry, cold drinks could be stored in the bottom below the floater 516 and hot hamburgers and fries above.

In another embodiment, the interior of the container 500 can include compartments, pockets and the like, for holding ice, packages of phase change materials, etc., for providing a desire temperature in the container. For example, in a preferred embodiment, one or more packages 554 of phase change materials can be placed in a pocket 556 in an interior sidewall or floater, for preserving a desired temperature for a longer period of time, as shown in FIG. 25.

As used herein, a phase change material (PCM) refers to materials that reversably absorb and release heat at a constant temperature during melting and freezing. PCMs have been used over the years and can be obtained from Phase Change Laboratories in San Diego, Calif. PCMs can be obtained for hot and cold medical therapy and food serving ware, for example. A package of PCMs generally include water and silica dry powder for cold medical therapy. The water/silica dry powder is charged (frozen) by placing the package containing the dry powder in a freezer compartment of a refrigerator for two to four hours prior to use. The powder remains soft and conformable even after freezing.

In more detail, these water/silica powders make use of high latent heat of fusion and crystallization of water (80 calories/gram) and, therefore can supply cold temperatures at about zero degrees centigrade for several times as long as liquid water and gels on the market that use the much lower sensible heat of water (one calorie/gram/degree centigrade), according to the literature.

PCMs can be used as hot or warm supplies as well. For example, a hot package can be charged by heating for about four minutes in a conventional microwave oven. Likewise, hot packages of dry powders also remain conformable above and below use temperature. As should be understood, these PCM are preferred, and other similar temperature sources or active temperature elements are availabe as hot, chill or cold sources, and can be used in connection with this invention.

As shown in FIGS. 23 and 24, the body 502 includes reinforcement sections 546, preferably in the form of straps, at least partially around the body 502 and handles 548 connected thereto, to simplify carrying. More particularly, the handles 548 are adjustable carrying straps, which can include an extended position 550 providing dual shoulder straps and a retracted position 552 adapted to provide independent handles (carrying straps), for carrying heavier loads.

As detailed herein with respect to the insulative body, the body 502 can include: interior and exterior layers 540 and 542 having a coating of at least one of polypropylene and polyester; an insulative portion 544 comprising a batt of staple fibers being sandwiched between inside sides of the interior and exterior layers; and a binding structure 528, 530 and 532 along perimeter edges of the interior and exterior layers 540 and 542 securing the insulative portion 544 therein. In one embodiment, the batt of staple fibers comprises a layer of at least one of spun bonded material and Hallofil. This construction provides a light weight yet effective insulated container for many applications. In a preferred embodiment, the interior and exterior layers 540 and 542 comprise a coated, spun bonded material, with the coating being polypropylene, polyester, blends thereof and the like. For example, the interior and exterior layers 540 and 542 comprise a layer of Mylar, Nylon, polyester, Vinyl or the like.

In certain applications, between the insulative portion 544 and the interior and exterior layers 540 and 542 are intermediate layers of a spun bonded material, defining at least a five or more layer construction. This construction can provide a desired insulation value, while being light weight. For example, the insulative portion 544 can include one or more layers of a spun bonded material, one or more layers of a polyester Hallofil material and the like.

In a preferred embodiment, the batt of staple fibers includes a substantially intimate blend of fibers with a substantially consistant and uniform density, for improved insulation. Thus, when appropriately constructed, the body 502 and door 514 include a self-inflatable and substantially springy insulation layer.

In a prefered embodiment, the insulative body 502 can comprise: interior and exterior layers having a coating of at least one of polypropylene and polyester; an insulative portion comprising a batt of staple fibers being sandwiched between inside sides of the interior and exterior layers; and a binding structure along perimeter edges of the interior and exterior layers securing the insulative portion therebetween. This construction is a cost effective improvement to insulate and minimize temperature fluctuations of temperature sensitive materials.

In one embodiment, the insulative portion or batt of staple fibers comprises a layer of at least one of spun bonded material and Hallofil placed between the interior and exterior layers to provide a predetermined thickness and density, to provide a desired insulation. Moreover, the batt of staple fibers herein provides a self-inflatable construction for improved insulation. It is believed that the insulative portion or batt of staple fibers includes a plurality of fibers each with hallow portions that trap air. Additionally, the batt also has air between each fiber. Thus, this construction provides at least two individual air pockets or insulation barriers comprising air.

The exterior layer can include a substantially clear window adapted to receive a document viewable through the window. The window could include a shiping destination document, for example.

In a preferred embodiment, the interior and exterior layers comprise a coated, spun bonded material, the coating comprising at least one of polypropylene and polyester. The coating provides a substantially air-tight construction, for good self-inflating properties and improved insulation. In more detail, the interior and exterior layers comprise at least one layer of Mylar, Nylon and Vinyl, for a cost effective and suitable air-tight construction.

The body includes an interior portion, an exterior portion and an insulative portion, which comprise durable materials that can substantially withstand abrasion and severe environments. Various costructions are possible, depending on the application and requirements.

In one body construction, between the insulative portion and the interior and exterior layers are intermediate layers of a spun bonded material, defining a five or more layer construction, for improved durability and resiliance (or a springy construction).

In one example, the insulative portion comprises one or more layers of a spun bonded material and one or more layers of a polyester Hallofil or generic Hallofil material, depending on the desired density and insulation properties. The term Hallofil is a term of art and has its ordinary meaning. In a preferred embodiment, the Hallofil is Dacron Hallofil polyester 808/908 from DuPont. It should be understood that other Hallofils and insulative materials and constructions may be used, depending on the requirements and specifications.

In a preferred embodiment, the container 500 includes a Mylar interior layer 540 and Mylar exterior layer 542 off 600 denier polyester block, and an insulation portion 544. The insulative portion comprises:

(i) a first cell comprising a layer of Typar, fiber with a density of one, one and a half or two ounces, depending on the required specifications, and another layer of Typar, sown (or suitably attached) together; and a second cell of the same, each of the two cells sown (or suitably attached) together; or (ii) one cell comprising two layers of Typar with a fiber sandwiched therebetween, the fiber having a density of one, one and a half or two ounces, sewn together at the outer peripheries.

COMPARATIVE EXAMPLES

All of the tests involved using approximately a one foot square swatch of material, exposing it to various temperatures and recording the results, as shown in Tables 1 and 2.

Comparative Example 1 in the tables, included a conventional bubble pack with reflective foil on one side.

Example 2 included three layers, specifically Typar, a Dacron Hallofil polyester 808/908 one ounce density, and Typar.

Example 3 included two cells of the sample in Example 2. More specifically, this sample included a first cell of Typar, Dacron Hallofil polyester (DuPont 808/908) and Typar, and a second cell of Typar, Dacron Hallofil polyester (DuPont 808/908) and Typar sewn together to form a swatch. This construction is referred to as an Ultra Therma construction.

Example 4 included three layers, specifically Typar, a Dacron Hallofil polyester 808/908 one and a half ounce density, and Typar.

Example 5 included the Ultra Thermal construction in Example 3, with two layers of a more dense or one and a half ounce density Dacron Hallofil polyester 808/908.

Example 6 included a similar construction as in Example 4, but with a two ounce density for the Dacron Hallofil polyester 808/908.

Example 7 included the Ultra Thermal construction in Example 5, with two layers of a more dense or two ounce density of Dupont 808/908.

Example 8 included the same construction as in Example 3, and further included two 600 denier polyester black and Mylar outer and inner coatings, respectively, defining a five layer construction.

Example 9 included the same construction as in Example 6, and further included two 600 denier polyester black and grey outer and inner coatings, respectively, defining a five layer construction.

Comparative Example 10 included a four layer swatch of Nylon, bubble pack with foil, sponge foam of about one inch in thickness and Nylon.

Comparative Example 11 included a three layer swatch of Nylon, bubble pack and Nylon.

As shown in Examples 2–9, improved R values (insulation values) can be achieved with the constructions detailed herein.

Courier Expressable Cargo Quilt and Method Therefor

Figure 39:
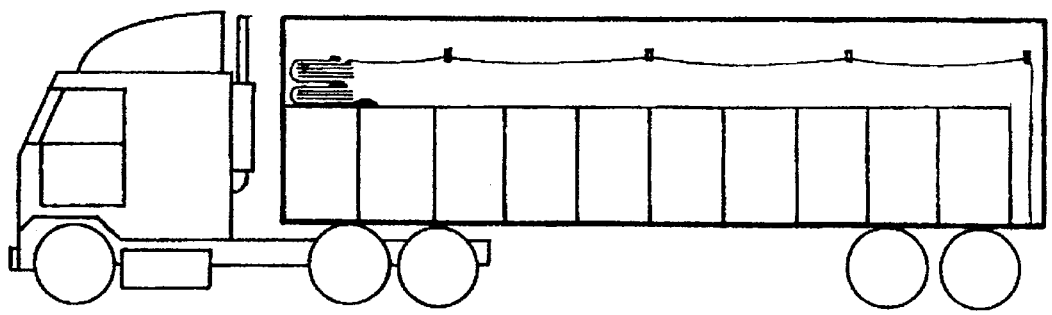
FIG. 39 is a schematic, side view of a loaded trailer with two courier expressable cargo quilt units in place in normal use, in accordance with the present invention.

As shown in FIGS. 29–42, a courier expressable cargo quilt 610 is shown. The quilt 610 comprises: an elongated, substantially rectangular body 612 comprising an insulative material including a plurality of panels 614 substantially foldably connected 616, defining an accordian-like structure 618, the accordian-like structure 618 having an unfolded position 620 (as shown in FIG. 41) adapted to facilitate placement of the body 612 substantially over a tmperature sensative load or cargo by unfolding the accordian-like structure 618 and a folded position 622 (as shown in FIGS. 5, 7 and 39) adapted to provide a courier-expressable cargo quilt; and an exterior cover structure 624 adapted to at least partially enclose the accordian-like structure 618.

FIG. 36 is an enlarged, partial cross section of the quilt 610, and shows foldable connections 616 including an inside fold area 626 and an outside fold area 628 having a binding 630 around the outside fold area 628. In a preferred embodiment, the inside fold area 626 can be substantially free of any structure, to provide a thin and narrow profile (accordian-like structure 618), for simplified carrying and shipping.

FIG. 35 is a schematic, side cross section of a preferred embodiment of the quilt 610, with the exterior cover structure 624 having a first cover section 634 and a second cover section 640 of sufficient dimension to substantially enclose the foldable connections 616 and to be inter-connectable with each other. This structure is configured to minimize the over all weight and can be made of a durable material to withstand shipping and the harsh environment to which it will be exposed. In more detail, the first cover section 634 is sufficiently dimensioned to substantially enclose one side 636 of the foldable connections and a top 638 of the accordian-like structure 618, and the second cover section 640 sufficiently dimensioned to substantially enclose a second side 642 of the foldable connections, opposite the first cover section 634.

FIG. 33 is a perspective view of the courier expressable cargo showing two interconnected cargo quilts 648 and 650, in a partially open and laid flat condition, the second cargo quilt 650 is opened and laid on top of the first cargo quilt unit, the first 648 and second cargo quilts 650 are interconnected, and pull rings are shown clipped to hook rings. More specifically, in a preferred embodiment, a fastening structure 646 adapted to facilitate fastening and unfastening (or connecting and unconnecting) the first courier-expressable cargo quilt 648 with the second courier-expressable cargo quilt 650. This structure 646 can include a hook and ring structure, for example.

In one embodiment, at least one of a body 612 and exterior cover structure 624 is disconnectably inter-connectable with at least one of a second body 612 and exterior cover structure 624, whereby an elongated cargo quilt comprising two courier-expressable cargo quilts 648 and 650 is provided. As detailed below with respect to FIGS. 39–42, this structure can easily be positioned over a load or cargo.

In one embodiment, the quilt 610 includes at least one interconnectable strap 654 and ring 656. In more detail, in FIG. 29 the quilt 610 is shown in a portable and closed condition, and in FIG. 30 in a partially open condition. This structure can simplify the use of the quilt 610, by providing a simple structure for open and closing locking and unlocking the quilt 610. The strap 654 can include a mechanism 658 for inter-connecting to itself, such as a Velcro inter-connectable structure, for example as shown in FIG. 38.

In one embodiment, as shown in FIGS. 29 and 30, the quilt 610 can include a plurality of inter-connectable straps and rings 660.

Also shown in FIGS. 33 and 39–42, further fastening structure 662 can be utilized for connecting to a hook 664 with a chord 666, for moving the accordian-like structure 618 to an unfolded position.

In FIGS. 39–41 and 43, a method of placing a courier-expressable cargo quilt at least partially over a load 670 is shown. The method 670 can include the steps of: providing 672 an elongated, substantially rectangular body comprising an insulative material including a plurality of panals foldably connected, defining a substantially portable condition and further defining an accordian-like structure; at least partially opening 674 a cover structure of the body to expose an anchor structure connected to at least one of the plurality of panels; and pulling 676 the anchor structure and unfolding the plurality of panels over a load, whereby the body is substantially positioned over a load.

In more detail, the providing step 672 can include providing at least a first, top substantially rectangular body disconnectably connected to a second, bottom substantially rectangular body, as shown in FIG. 33, for covering longer cargos, such as 53 feet, of temperature sensitive materials, for example.

Figure 40:
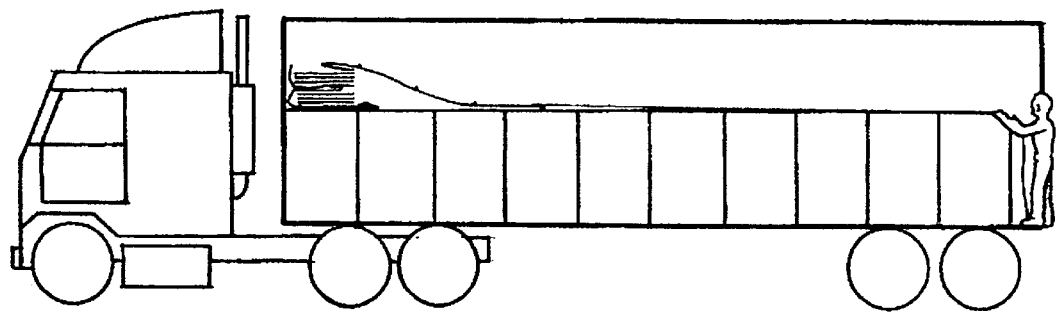
FIG. 40 is a schematic, side view of a loaded trailer with two courier expressable cargo quilt units in place in normal use, with a top unit being pulled over a cargo, in accordance with the present invention.
Figure 41:
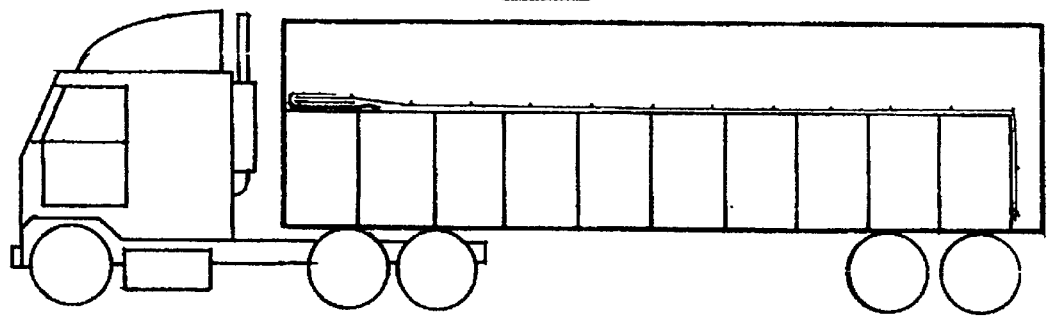
FIG. 41 is a schematic, side view of a loaded trailer with two courier expressable cargo quilt units in place in normal use, with the cargo covered, in accordance with the present invention.

In a preferred embodiment, the pulling step 676 includes pulling an anchor structure of the first, top substantially rectungular body substantially horizontally and unfolding substantially most of the panels from the first, top and second, bottom substantially rectangular bodies over a load, as illustrated in FIGS. 40 and 41.

Also in one embodiment, the at least partially opening step 674 includes unlocking a first exterior fastening structure and a second interior fastening structure, to expose the anchor structure.

The pulling (and unfolding) step 676 can further include providing a chord structure connected to the anchor structure, for facilitating the unfolding of the plurality of panels over a load.

Figure 42:
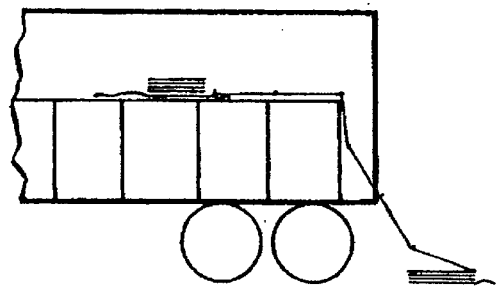
FIG. 42 is a schematic, side view of a loaded trailer with two courier expressable cargo quilt unitswith the units being removed and folded, in accordance with the present invention.
Figure 43:
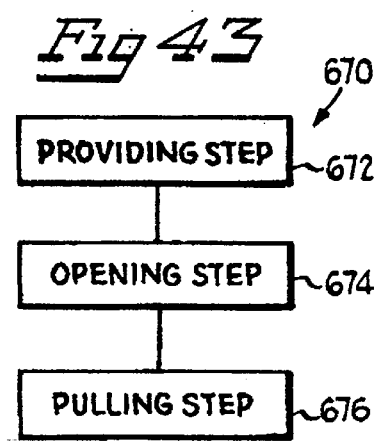
FIG. 43 shows the process of using the quilt unit.

After the unfolding step, the method 670 can further include: folding the accordian-like structure 618 as shown in FIG. 42, in a folded position; and closing the cover structure, to provide a courier-expressable cargo quilt, in the following order, as shown in FIGS. 32, 31, 30 and 29. In more detail, the closing step can include fastening interior and exterior fastening structures, as shown in FIGS. 30 and 29, respectively.

In a preferred embodiment, the providing step can include providing an insulative material including at least one of a bubble pack structure and fiberous material, to provide a desired R value. In a preferred embodiment, the quilt comprises three layers, specifically Typar, a Dacron Hallofil polyester 808/908 about one to about two ounce density, and Typar, with Vynal covers and a four foot long under cover with folding instructions printed on it. As will be appreciated by those skilled in the art, many other constructions can be used in the instant cargo quilt, without departing from the scope of the invention.

Although various embodiments of the invention have been shown and described, it should be understood that various modifications and substitutionns, as well as rearrangements and combinations of the preceding embodiments, can be made by those skilled in the art.

What is claimed is:

1. A courier-expressible cargo quilt, comprising:

an elongated, substantially rectangular body comprising an insulative material including a plurality of panels substantially foldably connected, defining an accordian-like structure, the accordian-like structure having an unfolded position adapted to facilitate placement of the body substantially over a temperature sensative load by unfolding the accordian-like structure and a folded position adapted to provide a courier-expressible cargo quilt;

an exterior cover structure adapted to at least partially enclose the accordian-like structure including a first cover section sufficiently dimensioned to substantially enclose at least one side of the foldable connections and a top portion of the accordian-like structure, and a second cover section sufficiently dimensioned to substantially enclose at least a second side of the foldable connections, partially opposite the first cover section; and an interconnectable mechanism having an interconnected condition where the first and second cover sections can substantially maintain the accordian-like structure in the folded position, and a disconnected for facilitating placement over a temperature sensitive load.

2. The courier-expressible cargo quilt of claim 1, wherein the exterior cover structure is dimensioned to substantially surround the accordian-like structure in the folded position and includes the first and second cover sections.

3. The courier-expressible cargo quilt of claim 2, wherein the foldable connections include an inside fold area and an outside fold area, at least one of the inside fold area and outside fold area being substantially free of any structure.

4. The courier-expressible cargo quilt of claim 2, wherein the interconnectable mechanism comprises a Velcro-like structure.

5. The courier-expressible cargo quilt of claim 2, wherein the exterior cover structure is connected to the body.

6. The courier-expressible cargo quilt of claim 2, wherein the panels are defined by at least one fold in the body.

7. The courier-expressible cargo quilt of claim 5, wherein the connection includes the cover and the body being sewed together.

8. The courier-expressible cargo quilt of claim 1, wherein the accordian-like structure comprises at least one interconnectable strap and ring.

9. The courier-expressible cargo quilt of claim 2, wherein the accordian-like structure comprises at least one outer panel being defined by an end and a fold area in the body and an inner panel being defined by two fold areas.

10. The courier-expressible cargo quilt of claim 1, further comprising a fastening structure for connecting to a hook with a chord, for facilitating placement of the accordian-like structure in an unfolded condition.

* * * * *